United States Patent
Tang et al.

(10) Patent No.: US 11,661,032 B2
(45) Date of Patent: May 30, 2023

(54) AUGMENTED REALITY DISPLAYED KEYPAD FOR AUTHENTICATED KEYLESS DOOR ACCESS

(71) Applicant: Capital One Services, LLC, McLean, VA (US)

(72) Inventors: Qiaochu Tang, Frisco, TX (US); Geoffrey Dagley, McKinney, TX (US); Avid Ghamsari, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 32 days.

(21) Appl. No.: 17/451,382

(22) Filed: Oct. 19, 2021

(65) Prior Publication Data

US 2023/0120250 A1    Apr. 20, 2023

(51) Int. Cl.
| | |
|---|---|
| *B60R 25/24* | (2013.01) |
| *G07C 9/23* | (2020.01) |
| *G06V 20/20* | (2022.01) |
| *B60R 25/01* | (2013.01) |
| *G06F 3/01* | (2006.01) |
| *B60R 25/23* | (2013.01) |
| *B60R 25/30* | (2013.01) |
| *B60R 25/20* | (2013.01) |
| *G06T 19/00* | (2011.01) |

(52) U.S. Cl.
CPC ............ *B60R 25/24* (2013.01); *B60R 25/01* (2013.01); *B60R 25/209* (2013.01); *B60R 25/2045* (2013.01); *B60R 25/23* (2013.01); *B60R 25/305* (2013.01); *G06F 3/011* (2013.01); *G06T 19/006* (2013.01); *G06V 20/20* (2022.01); *G07C 9/23* (2020.01); *B60R 2325/205* (2013.01)

(58) Field of Classification Search
CPC ..... B60R 25/24; B60R 25/01; B60R 25/2045; B60R 25/209; B60R 25/23; B60R 25/305; B60R 2325/205; G07C 9/23; G06V 20/20; G06F 3/011; G06T 19/006
See application file for complete search history.

(56) References Cited

U.S. PATENT DOCUMENTS

| | | | | |
|---|---|---|---|---|
| 10,087,671 | B2 * | 10/2018 | Linden | .............. E05B 81/14 |
| 10,377,343 | B2 * | 8/2019 | Krishnan | ........... G07C 9/00817 |
| 11,430,276 | B1 * | 8/2022 | McLachlan | ......... G06F 3/04847 |
| 2006/0145825 | A1 * | 7/2006 | Mc Call | .............. B60R 25/2045 |
| | | | | 340/426.35 |
| 2014/0015637 | A1 | 1/2014 | Dassanayake et al. | |
| 2016/0148487 | A1 * | 5/2016 | Thomas | .............. G06F 3/04886 |
| | | | | 340/686.6 |
| 2019/0121522 | A1 * | 4/2019 | Davis | .................. G02B 27/017 |
| 2021/0409539 | A1 * | 12/2021 | Arellano | ............... G06F 3/0484 |

* cited by examiner

*Primary Examiner* — Thomas D Alunkal
(74) *Attorney, Agent, or Firm* — Harrity & Harrity, LLP (57) ABSTRACT

In some implementations, a device may receive an indication of a code associated with granting authenticated access to a door. The device may transmit, to a user device, presentation information to cause an augmented reality image of an input pad to be displayed by the user device, wherein the augmented reality image is displayed over an area of an image of an exterior of the door via a user interface. The device may detect, via a camera device, one or more user inputs to the area of the exterior of the vehicle based on tracking a movement of a user. The device may identify an input code based on the one or more user inputs. The device may perform an action to cause the door to be unlocked based on the input code matching the code.

20 Claims, 8 Drawing Sheets

AUGMENTED REALITY DISPLAYED KEYPAD FOR AUTHENTICATED KEYLESS DOOR ACCESS

BACKGROUND

Augmented reality (AR) may refer to a live view of a physical, real-world environment that is modified by a computing device to enhance an individual's current perception of reality. In augmented reality, elements of the real-world environment are "augmented" by computer-generated or extracted input, such as sound, video, graphics, haptics, and/or global positioning system (GPS) data, among other examples. Augmented reality may be used to enhance and/or enrich the individual's experience with the real-world environment.

SUMMARY

Some implementations described herein relate to a system for providing an augmented reality displayed keypad for authenticated keyless vehicle access. The system may include a camera device mounted on a vehicle one or more vehicle systems associated with the vehicle. The system may include one or more vehicle systems associated with the vehicle. The system may include one or more memories and one or more processors coupled to the one or more memories. The one or more processors may be configured to receive an indication of a code associated with granting authenticated access to the vehicle. The one or more processors may be configured to transmit, to a user device, presentation information to cause an augmented reality image of the keypad to be displayed by the user device, wherein the presentation information causes the augmented reality image to be displayed on a user interface of the user device in an area of an image of an exterior of the vehicle, and wherein the area of the exterior of the vehicle does not include any markings or indications of the keypad. The one or more processors may be configured to detect, via the camera device, one or more user inputs to the area of the exterior of the vehicle based on tracking a user movement by the camera device. The one or more processors may be configured to identify an input code based on the one or more user inputs, wherein the input code corresponds to a series of inputs to the keypad entered by a user, of the user device, to the area of the exterior of the vehicle. The one or more processors may be configured to provide access to at least one vehicle system, of the one or more vehicle systems, based on the input code matching the code associated with granting authenticated access to the vehicle.

Some implementations described herein relate to a method for providing an augmented reality displayed input pad for authenticated keyless door access. The method may include receiving, by a device, an indication of a code associated with granting authenticated access to the door. The method may include transmitting, by the device and to a user device, presentation information to cause an augmented reality image of the input pad to be displayed by the user device, wherein the presentation information causes the augmented reality image to be displayed by the user device over an area of an image of an exterior of the door via a user interface of the user device, and wherein the area of the exterior of the door does not include any markings or indications of the input pad. The method may include detecting, by the device and via a camera device associated with the door, one or more user inputs to the area of the exterior of the vehicle based on tracking a movement of a user. The method may include identifying, by the device, an input code based on the one or more user inputs, wherein the input code indicates a series of inputs to the input pad as depicted via the augmented reality image. The method may include performing, by the device, an action to cause the door to be unlocked based on the input code matching the code associated with granting authenticated access to the vehicle.

Some implementations described herein relate to a non-transitory computer-readable medium that stores a set of instructions for a user device. The set of instructions, when executed by one or more processors of the user device, may cause the user device to receive, from a server device or a vehicle device, an indication of a code associated with granting authenticated access to the vehicle. The set of instructions, when executed by one or more processors of the user device, may cause the user device to provide the code for display via a user interface associated with the user device. The set of instructions, when executed by one or more processors of the user device, may cause the user device to receive, from the server device or the vehicle device, presentation information to cause an augmented reality image of a keypad to be displayed via the user interface, wherein the presentation information indicates a location on an exterior of a vehicle where the augmented reality image is to be inserted. The set of instructions, when executed by one or more processors of the user device, may cause the user device to insert the augmented reality image in an image of the vehicle at the location on the exterior of the vehicle in the image. The set of instructions, when executed by one or more processors of the user device, may cause the user device to provide the image with the augmented reality image inserted for display via the user interface to enable a user of the user device to provide one or more user inputs on the exterior of the vehicle, wherein the one or more user inputs correspond to keys associated with the keypad for entering the code, and wherein the exterior of the vehicle does not include any markings or indications of the keypad.

DETAILED DESCRIPTION

The following detailed description of example implementations refers to the accompanying drawings. The same reference numbers in different drawings may identify the same or similar elements.

Typically, to unlock a door that is locked, a key or other device is required. For example, a user my unlock the door using a key. In some examples, an access device, such as a user device, a key fob, a wireless communication device, and/or a similar type of device that is programmed for unlocking the door, may be used by a user to unlock the door. However, the use of a key and/or access device to unlock a door requires that the key or access device be present when the door is unlocked. For example, an owner of a vehicle or building may be required to give the key or access device to another user that the owner wishes to grant access to the vehicle or building (e.g., to enable the other user to unlock a door of the vehicle or building). This presents a security risk because the other user may not return the key or access device, may copy the key or access device (e.g., to enable the other user to unlock the door at a future time), and/or may access the locked door beyond a permitted or allowable time (e.g., the owner may allow the other user to access the vehicle or building for a limited amount of time, but because the other user has the physical key or access device, the owner cannot take access to the vehicle or building away from the other user without physically retrieving the key or access device or without changing the lock of the door), among other examples.

In some cases, temporary access to a locked door may be enabled by using a keypad installed in or near the door. For example, an owner may provide another user a code that can be used to unlock the door. The user may input the code into the keypad to cause the door to unlock. However, this requires that the keypad be physically installed on or near the door. For example, additional hardware components (e.g., the keypad, sensors, and/or other electrical components) may be needed to enable the keypad to cause the door to be unlocked. This increases a cost and complexity associated with unlocking the door. Additionally, the keypad installed on or near the door (e.g., near a door of a building or vehicle) may be visually unpleasant for a user (e.g., may decrease an attractiveness of the vehicle or building, thereby reducing a value of the vehicle or building). Moreover, a keypad physically installed on or near the door may enable a malicious actor to guess or enter the correct code, even if the code is not provided to the malicious actor (e.g., because it is clear where the code is to be entered).

Some implementations described herein enable an augmented reality (AR) displayed keypad for authenticated keyless door (e.g., vehicle or building) access. AR may be used to superimpose virtual elements (sometimes referred to as AR elements herein) on a display of an image of an environment that is being captured (e.g., in real time). For example, a user of a user device (e.g., a smartphone, a tablet, and/or smart glasses, among other examples) may use a camera of the user device to capture video of the user's surroundings, and the user device (e.g., executing an AR application running on the user device) may superimpose one or more AR elements on the image being captured by the user device in an AR user interface. Some implementations described herein may enable a user device to display a keypad as an AR element over an image of a door. The AR element (e.g., the AR keypad) may be displayed at a location in the image that is associated with a location on or near the door that is tracked by a camera device.

For example, the AR element may aid a user to show a user where to provide inputs on the exterior of the door. In some implementations, the user device may not track any inputs. Rather, the camera device may track a user movement or input to the exterior of the door (e.g., that is guided by the AR element of the keypad being displayed on the user device) to detect a code or input provided by the user. In other words, the exterior of the door may not include any actual markings, indications, or components associated with the keypad (e.g., the exterior of the door may not be modified in any way). This increases security of the door because the keypad is effectively invisible to anyone who does not have access to the AR element. A code or input may be provided to the user device by a server device and/or by a communication device associated with the door. The user device may provide an indication of the code or input to the user (e.g., by providing the code or input for display). The user may input the code or input by interacting with (e.g., touching) the exterior of the door in an area indicated by the AR keypad being displayed on the user device (e.g., the AR keypad being displayed on the user device may guide the user on where to touch on the exterior of the door). A camera device associated with the door may track the user inputs and may determine an input provided (e.g., by correlating the location of the user input to an input of the AR keypad as displayed on the user device). A device associated with the door may determine the input provided by the user and may determine if the input matches the code or other input provided to the user device. If the input provided by the user matches the code or other input provided to the user device, then the device may cause the door to be unlocked.

In this way, a secure method of unlocking a door may be provided that does not require a key or other access device and that does not require any modifications or additions be made to the lock, the door, and/or the exterior of the door. For example, no physical keypad is needed and/or no markings or indications of the keypad are provided on the exterior of the door. For example, no sensors or other components are needed to enable the user to provide an input to the exterior of the door. This conserves manufacturing costs and reduces a complexity associated with unlocking the door. Additionally, this allows the location where the inputs are provided (e.g., on the exterior of the door or vehicle) to be changed over time, thereby increasing a security associated with the locked door (e.g., because a previous user who was previously provided access to unlock the door, but is no longer permitted to unlock the door, may not be able to re-enter the input in a same location if the location is changed).

Additionally, by coordinating the code between the user device and the camera device and/or other devices associated with the door, a security associated with providing access to unlock the door is improved. For example, if the user device alone were to provide the AR keypad for display, track the user inputs to detect the input provided by the user, and determine if the input matches a code for unlocking the door, a malicious actor will only need to compromise or hack the user device to cause an indication to be provided that the input provided matches the code for unlocking the door (e.g., even if the correct code was not entered). By coordinating the code between the user device and the camera device and/or other devices associated with the door, a difficulty associated with providing a fake indication that the correct code is entered is increased.

FIGS. 1A-1D are diagrams of an example 100 associated with an AR displayed keypad for authenticated keyless door access. As shown in FIGS. 1A-1D, example 100 includes a user device, a vehicle, a server device, and a camera device. These devices are described in more detail in connection with FIGS. 2 and 3.

Example 100 is associated with enabling a user to unlock a door, such as a door of a vehicle or a building, via an AR displayed keypad on a user device. For example, although examples herein are described in connection with causing a door of a vehicle to be unlocked, the techniques and operations described herein may be similarly applied to any door that has a lock to cause the lock of the door to become unlocked. For example, while examples herein are described in connection with accessing a vehicle, the techniques and operations described herein may be similarly applied to enable a user to access a building, a home, and/or a hotel, and/or a room of a building, a home, and/or a hotel, among other examples. As used herein, an operation described as being performed by "the vehicle" may refer to a computing device and/or a communication device of the vehicle performing the operation (e.g., a computing device and/or a communication device included in the vehicle).

Figure 1A:
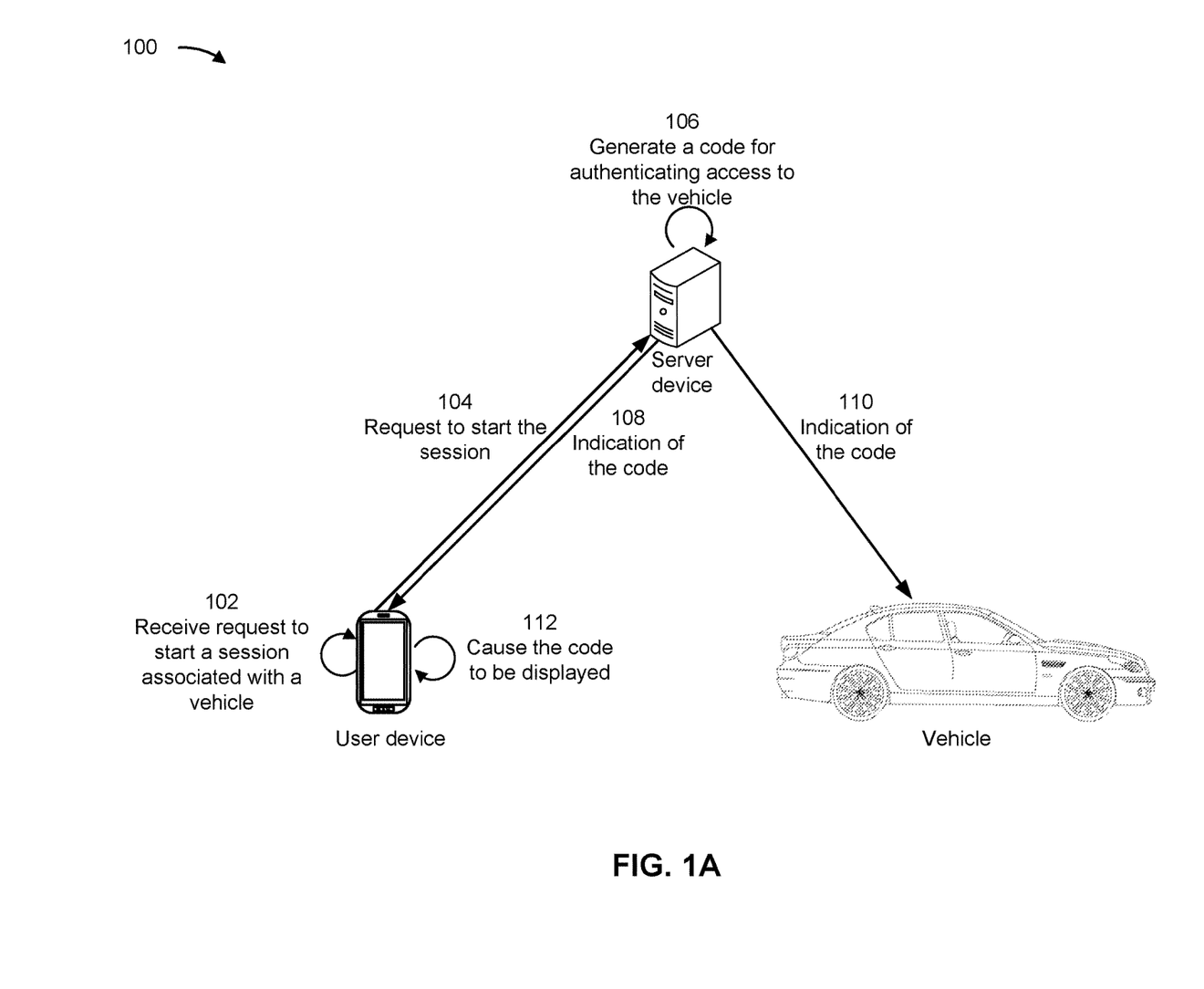
FIGS. 1A-1D are diagrams of an example implementation relating to an augmented reality displayed keypad for authenticated keyless door access.

As shown in FIG. 1A, and by reference number 102, the user device may receive a request to start or initiate a session associated with a vehicle. For example, the user may not be the owner of the vehicle and may wish to access the vehicle (e.g., temporarily). For example, the user may wish to test drive the vehicle, rent the vehicle, and/or otherwise access the vehicle for a limited amount of time. In some other examples, the user may be the owner of the vehicle and the user may use the techniques described herein to access and/or unlock a door of the vehicle.

The session may be associated with temporary access to the vehicle. For example, a web page or an application executing on the user device may be associated with providing temporary access to vehicles (e.g., may be a web page or an application for enabling the user to test drive or otherwise temporarily access the vehicle in an authenticated manner). The user device may receive the request to start the session associated with the vehicle based on a user interaction with a user interface displayed by the user device.

As shown by reference number 104, the user device may transmit, and the server device may receive, a request to start the session. In some implementations, the request to start the session may include user information associated with the user. For example, the request to start the session may include a user identifier, an identifier of the user device, a name of the user, an address of the user, a phone number of the user, contact information for the user, and/or other information associated with the request. In some implementations, the request to start the session may indicate an amount of time for which the user desires to have access to the vehicle. In some implementations, the request to start the session may indicate a reason for requesting access to the vehicle (e.g., to test drive the vehicle, to rent the vehicle, and/or another reason).

In some implementations, the server device may be included in, or may be co-located with, the vehicle. For example, the server device may be a computing device and/or a communication device associated with the vehicle. In some other implementations, the server device may be separate from the vehicle (e.g., the server device may be a cloud computing device and/or may be located in a location that is remote from the vehicle). The server device may determine whether to initiate the session based on the request received from the user device. For example, the server device may determine whether the user is permitted to access the vehicle. In some implementations, the server device may determine whether the vehicle is available to be accessed (e.g., another user may be driving or accessing the vehicle causing the vehicle to be unavailable to be accessed). If the user is permitted to access the vehicle and/or the vehicle is available to be accessed, among other examples, the server device may determine that the session may be initiated. The server device may associate the session with the user information provided in the request to start the session. For example, the server device may associate the session with the user identifier, the identifier of the user device, the name of the user, the address of the user, the phone number of the user, and/or the contact information for the user, among other examples.

In some implementations, as shown by reference number 106, the server device may generate a code for authenticating access to the vehicle. The code may be a unique identifier that, when input by the user and/or when detected by the vehicle (or the camera device), causes a lock of a door of the vehicle to be unlocked. For example, the code, when input by the user and/or when detected by the vehicle (or the camera device), may cause the vehicle to grant access to one or more vehicle systems, as described in more detail elsewhere herein. The code may be a numeric code (e.g., one or more numbers), a word, a series of letters, an alphanumeric code, a series of numbers and symbols, a series of symbols, a shape (e.g., to be drawn by the user to input the code), a series of markings and/or shapes, and/or another unique code. The code may be associated with the session (e.g., that is associated with the user and/or the user device). In some implementations, the code may be associated with the vehicle (e.g., may be specific to the vehicle).

In some implementations, the code may be a temporary code. For example, the code may be changed by the server device from time to time. In some implementations, the server device may generate the code for the vehicle. The code associated with the vehicle may be changed by the server device periodically. For example, the server device may generate the code and the code may be used for all sessions associated with the vehicle. In some implementations, the code may be specific to the session associated with the user and/or the user device. For example, the server device may generate the code based on determining to initiate the session. In other words, the code may be unique or different for each session associated with the vehicle. By providing a temporary code that is periodically changed and/or that is unique or different for each session associated with the vehicle may improve the security of the vehicle because a malicious actor may be unable to reuse an old code to access the vehicle.

As shown by reference number 108, the server device may transmit, and the user device may receive, an indication of the code. In some implementations, as shown by reference number 110, the server device may transmit, and the vehicle (e.g., a computing and/or communication device of the vehicle) may receive, an indication of the code. In other words, the server device may provide the code to the user device and the vehicle separately. In some implementations, the server device may not provide the code to the vehicle and the vehicle may transmit, to the server device, an indication of an input code provided by the user to the vehicle (e.g., to enable the server device to determine if the input code matches the code provided to the user device). By providing the code to the user device and enabling the vehicle to determine the input code and/or determine if the input code matches the code, a security of the vehicle may be improved because a coordination between the user device and the vehicle is required to access the vehicle. In other words, to access the vehicle, the correct code must be provided to the user device and the correct code must be detected by the vehicle (e.g., the code must be correct at the user device and must be correctly detected by the vehicle). Therefore, a malicious actor would be required to manipulate and/or fabricate communications and/or operations at both the user device and the vehicle in order to gain access to the vehicle, thereby increasing a difficulty for the malicious actor to access the vehicle without permission.

As shown by reference number 112, the user device may cause the code to be displayed by the user device. For example, the user device may display an indication of the code via a user interface of the user device. In some implementations, the code may be transmitted to the user device via a text message, a short message service (SMS) message, a message transmitted via a web page or an application executing on the user device, and/or an automated voice call, among other examples. In some implementations, the reception of the indication of the code may cause the user device to display a notification, such as a popup notification or a banner notification, among other examples, that indicates the code. Displaying the indication of the code, by the user device, may enable the user to identify the code so that the user may input the code to the vehicle in order to gain access to the vehicle.

Figure 1B:
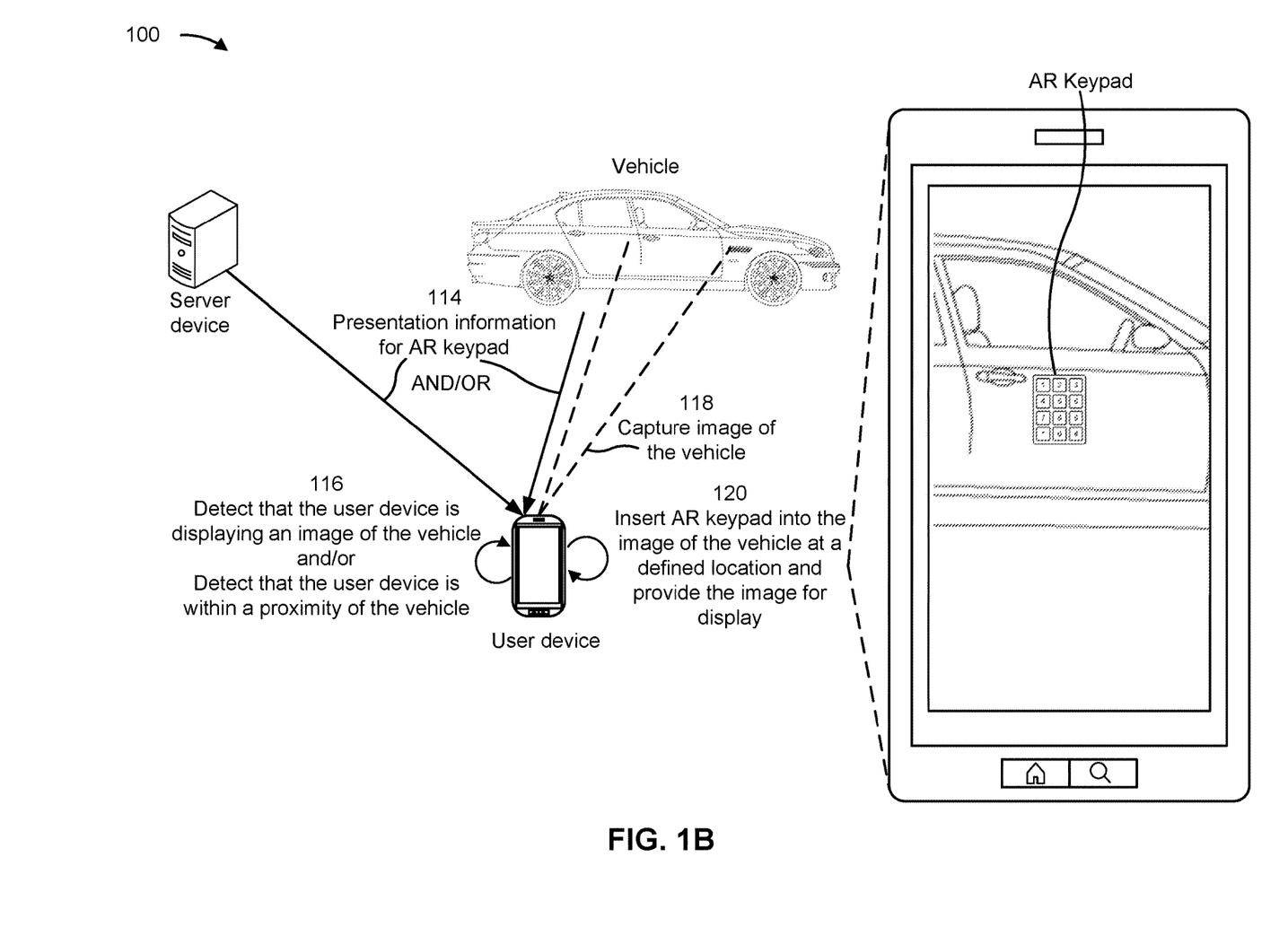

As shown in FIG. 1B, and by reference number 114, the user device may receive, and the server device and/or the vehicle may transmit, presentation information. For example, the vehicle may communicate with the user device (e.g., using Bluetooth communication, near field communication, and/or another communication technique) to provide the presentation information to the user device when the user device is within a communicative proximity of the vehicle. The presentation information may cause an AR image of a keypad to be displayed by the user device. The AR keypad may be an AR image of a numeric keypad (e.g., a number pad), an alphanumeric keypad, an input pad (e.g., with an input area for the user to draw or input the code), and/or a keyboard, among other examples. For example, in some cases, rather than a keypad, an AR input area may be presented for display in an image of the door that permits a user to draw a number, letter, symbol, shape, or some combination thereof as an input code.

In some implementations, the presentation information may indicate a location on the vehicle where the AR keypad is to be inserted and/or overlayed in an image of the vehicle (e.g., by the user device). For example, the presentation information may indicate an AR marker or other reference point on the vehicle. The presentation information may indicate a location, on the vehicle, where the AR keypad is to be inserted and/or overlayed in an image of the vehicle relative to the AR marker or reference point. In this way, the user device may determine where the AR keypad is to be inserted in an image of the vehicle to enable the user to provide inputs (e.g., to the exterior of the vehicle) in a correct location (e.g., because the exterior of the vehicle includes no indications or markings indicating the location where the inputs are to be provided).

As shown by reference number 116, the user device may detect that the AR image of the keypad (e.g., the AR keypad) is to be displayed by the user device. For example, the user device may detect that the user device is currently displaying an image of the vehicle and/or the user device may detect that the user device is within a proximity of (e.g., is within a threshold distance from) the vehicle. For example, as shown by reference number 118, a camera device of the user device may capture an image of the vehicle. The user device may display the image of the vehicle on the user interface of the vehicle. The user device may detect that an image of the vehicle is being captured.

As shown by reference number 120, the user device may modify the image of the vehicle by inserting the AR keypad into the image at a defined location. For example, the defined location may be indicated by the presentation information, as described above. The location where the AR keypad is inserted in the image of the vehicle may be a location on the exterior of the vehicle that is monitored by the camera device of the vehicle. For example, the vehicle and/or the camera device of the vehicle may be configured with the location on the exterior of the vehicle. The camera device may be configured to monitor the location to detect inputs, as described in more detail elsewhere herein. Therefore, the user device may ensure that the AR keypad is displayed in the correct location (e.g., in the image of the vehicle) to enable the user to provide inputs to the correct location on the exterior of the vehicle (e.g., the location that is being monitored by the camera device of the vehicle). In other words, the user device may insert the AR keypad into the image of the vehicle to simulate a keypad being located in the location on the exterior of the vehicle. As described elsewhere herein, the actual location on the exterior of the vehicle may not be modified in any way and may not actually include any markings or indications of the keypad.

In some implementations, the arrangement of keys on the AR keypad may change over time. For example, the vehicle and/or the server device may change the arrangement of keys as displayed in the AR keypad such that a malicious actor is unable to enter a code in the same location at a later time using the location previously displayed on a AR keypad (e.g., because the arrangement of the keys is now different). In some implementations, the server device may generate (e.g., randomly) an arrangement of keys for the AR keypad for each session. In some implementations, the keys of the AR keypad may be rearranged periodically (e.g., every N seconds). In some implementations, the keys of the AR keypad may be rearranged based on a user providing an input to the exterior of the vehicle (e.g., the keys of the AR keypad may be scrambled each time a user provides an input). This may improve a security of the vehicle because a difficulty of entering the correct code without the aid of the AR keypad displayed via the user device is increased.

In some implementations, the AR keypad may be a distributed keypad. For example, rather than the keys for the AR keypad being organized in a single location, the AR keypad may display keys and/or input areas at different locations on the image of the door or vehicle. For example, a user may be required to provide inputs to different locations on the exterior of the vehicle, rather than the input area or keypad being centralized in a single location. This may improve a security of the vehicle because the user is required to identify the correct locations to provide inputs over a larger area (e.g., over the entire vehicle), rather than the locations being centralized in a single location.

As shown in FIG. 1B, the user device may display the AR keypad inserted in the image of the vehicle. This may enable the user to detect where to touch or press on the exterior of the vehicle to input the code. For example, a hand of the user may be moved into the image displayed on the user device. The user may detect where to touch or press on the exterior of the vehicle to provide an input by moving the user's hand into a location indicated by a key of the AR keypad, as described in more detail elsewhere herein.

Figure 1C:
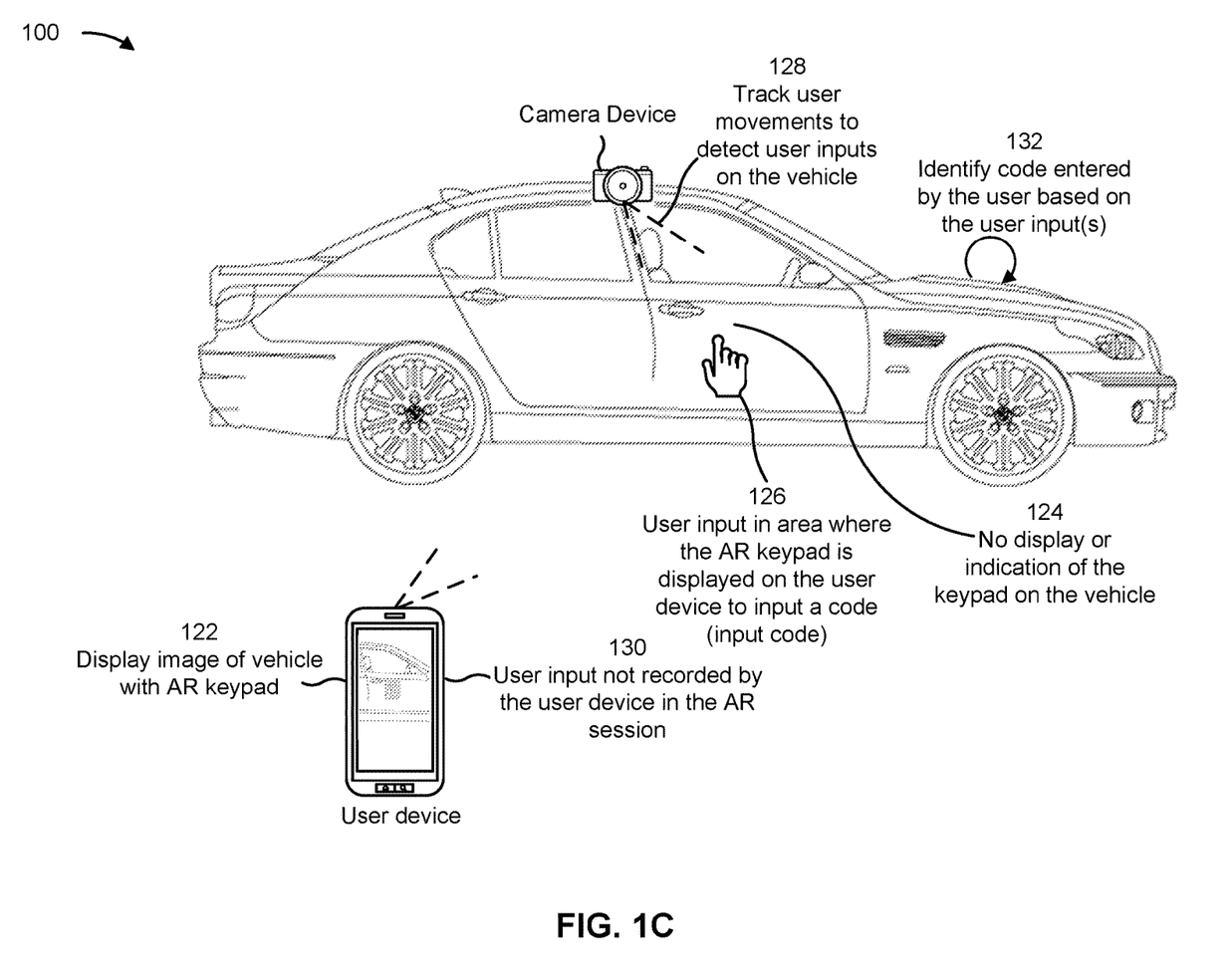

As shown in FIG. 1C, and by reference number 122, the user device may continue to display an image of the vehicle with the AR keypad inserted into the image. As described above, and as shown by reference number 124, there may be no display or indication of a keypad or input area on the exterior of the vehicle. For example, there may be no markings, paint, or other indications on the exterior of the vehicle indicating where the user is to provide inputs to input the code. In other words, the only indication provided to the user of where to provide the inputs is based on the AR keypad inserted into the image of the vehicle as displayed by the user device. For example, the location on the exterior of the vehicle where the inputs are to be provided may not include any components or sensors to track the inputs. Rather, the inputs are tracked by the camera device of the vehicle based on the camera device being configured with the location or area on the exterior of the vehicle where the inputs are to be provided, as explained in more detail elsewhere herein. This may improve a security of the vehicle because a malicious actor may not know where to provide the inputs without viewing the AR keypad on a user device. Additionally, this may reduce a cost and/or complexity of the vehicle because no components or sensors are required to be installed in the location of the exterior of the vehicle to track the inputs (e.g., the camera device may be part of one or more other vehicle systems, such as a vehicle tracking system that tracks movements and/or a location of the vehicle). Moreover, because the exterior of the vehicle is not modified with a physical keypad or a marking or indication of the keypad (such as paint), a visual attractiveness of the vehicle may be increased, thereby increasing a value of the vehicle (e.g., compared to a vehicle with a physical keypad installed on the vehicle and/or with markings or paint indicating where the user is to provide inputs). Alternatively, the user device (e.g., a camera device of the user device) may track movements of the user and determine inputs provided by the user in a similar manner as described herein in connection with the camera device associated with the vehicle.

As shown by reference number 126, the user may provide an input (e.g., a user input) in an area on the exterior of the vehicle where the AR keypad is displayed in the image of the vehicle to input the code. For example, if the code is "1234," then the user may detect a location (e.g., on the exterior of the vehicle) corresponding to an input of "1" based on the location of a "1" key on the AR keypad as displayed in the image of the vehicle. The user may provide an input (e.g., may touch or tap) to the exterior of the vehicle in the location corresponding to the input of "1." The user may detect a location (e.g., on the exterior of the vehicle) corresponding to an input of "2" based on the location of a "2" key on the AR keypad as displayed in the image of the vehicle. The user may provide an input (e.g., may touch or tap) to the exterior of the vehicle in the location corresponding to the input of "2." The user may continue this process to input the rest of the code (e.g., the code provided by the server device).

As shown by reference number 128, the camera device of the vehicle may track user movements to detect a user input on the vehicle. As described elsewhere herein, in some examples, a camera device of the user device may track user movements to detect the user input in a similar manner as described elsewhere herein. The user input may be an input code provided by the vehicle. As described in more detail elsewhere herein, the camera device may be an image capturing device and/or a light detection and ranging (Lidar) device. Lidar may also be referred to as three-dimensional laser scanning, three-dimensional scanning, and/or laser scanning, among other examples. For example, to detect an input provided by the user, the camera device may identify an angle between the location where the user provided the input (e.g., where the user touched or tapped on the exterior of the vehicle) and the camera device (e.g., an angle between the user input and the camera device). Similarly, the camera device may identify a distance between the location where the user provided the input and the camera device (e.g., a distance between the user input and the camera device). This may enable the camera device to determine a location on the exterior of the vehicle where the user provided the input. As described above, the camera device may be configured with the location where the AR keypad is being displayed in the image of the vehicle. Therefore, the camera device may be enabled to correlate different locations on the exterior of the vehicle with different keys as displayed via the AR keypad. The camera device may identify the location on the exterior of the vehicle where the user provided the input and may correlate the location to a key as displayed via the AR keypad. For example, the camera device may determine that the location where a user tapped or touched on the exterior of the vehicle corresponds to a key for the number "1" as displayed via the AR keypad. Therefore, the camera device may determine that the user input is "1." The camera device may continue to track the user's movements and determine input(s) provided by the user to the exterior of the vehicle in a similar manner as described above to determine the input code provided by the user.

In some implementations, the vehicle and/or the camera device may transmit, and the user device may receive, an indication of an input detected by the camera device. For example, when the camera device detects that a user has provided an input (e.g., has touched or tapped the exterior of the vehicle in a location corresponding to a key as displayed via the AR keypad), the vehicle and/or the camera device may transmit, and the user device may receive, an indication of the input detected by the camera device. In other words, the vehicle and/or the camera device may notify the user device of input(s) detected by the camera device. This may enable the user of the user device to identify if the input provided by the user was correctly detected by the camera device.

In some implementations, as shown by reference number 130, the user input(s) to the exterior of the vehicle may not be recorded or registered by the user device in an AR session associated with the user device. In other words, the user device may not track or determine when an input is provided by the user to the exterior of the vehicle. The user device may simply display the AR keypad inserted into the image of the vehicle as an aid for the user to determine where to touch or press on the exterior of the vehicle. Because the user device does not track or record the inputs provided by the user to the exterior of the vehicle, a difficulty of fabricating or faking inputs provided by the user may be increased. For example, if the user device were to track and/or record the inputs provided by the user, then a malicious actor may be enabled to fabricate the inputs provided on the user device and cause the user device to transmit a message to the vehicle and/or the server device that the code was correctly entered by the user (e.g., even if the correct code was not entered by the user). Therefore, by enabling the camera device of the vehicle to track and/or determine the inputs provided by the user and causing the user device to only serve as a visual aid for the user, a security of the vehicle may be improved.

As shown by reference number 132, the vehicle may identify the input code entered by the user based on the user inputs. For example, the camera device may determine the location(s) on the exterior of the vehicle that the user tapped, touched, or otherwise interacted with. In some implementations, the camera device may correlate the location(s) on the exterior of the vehicle with an input (e.g., a number, a letter, and/or a symbol). In some implementations, the camera device may transmit an indication of the location(s) to another device associated with the vehicle and the other device may correlate the location(s) on the exterior of the vehicle with an input (e.g., a number, a letter, and/or a symbol). The vehicle may identify the input code provided by the user based on correlating the location(s) on the exterior of the vehicle that the user interacted with to input values.

In this way, the user may provide input to a blank exterior of the vehicle as if there were a keypad on the exterior of the vehicle. The camera device may track the user movements to enable the vehicle to detect inputs as if there were a keypad on the exterior of the vehicle. Therefore, the AR keypad displayed on the user device may enable the user device and/or the vehicle to simulate the presence of a keypad or other input pad on the exterior of the vehicle without requiring any physical modifications to be made to the vehicle itself. As a result, the location of the area of the vehicle where the AR keypad is displayed (e.g., in the image of the vehicle) and/or the area of the vehicle that is monitored and/or tracked by the camera device to detect user inputs may be flexibly and easily changed over time. This may improve a security of the vehicle by changing the location where inputs need to be provided on the exterior of the vehicle over time.

Figure 1D:
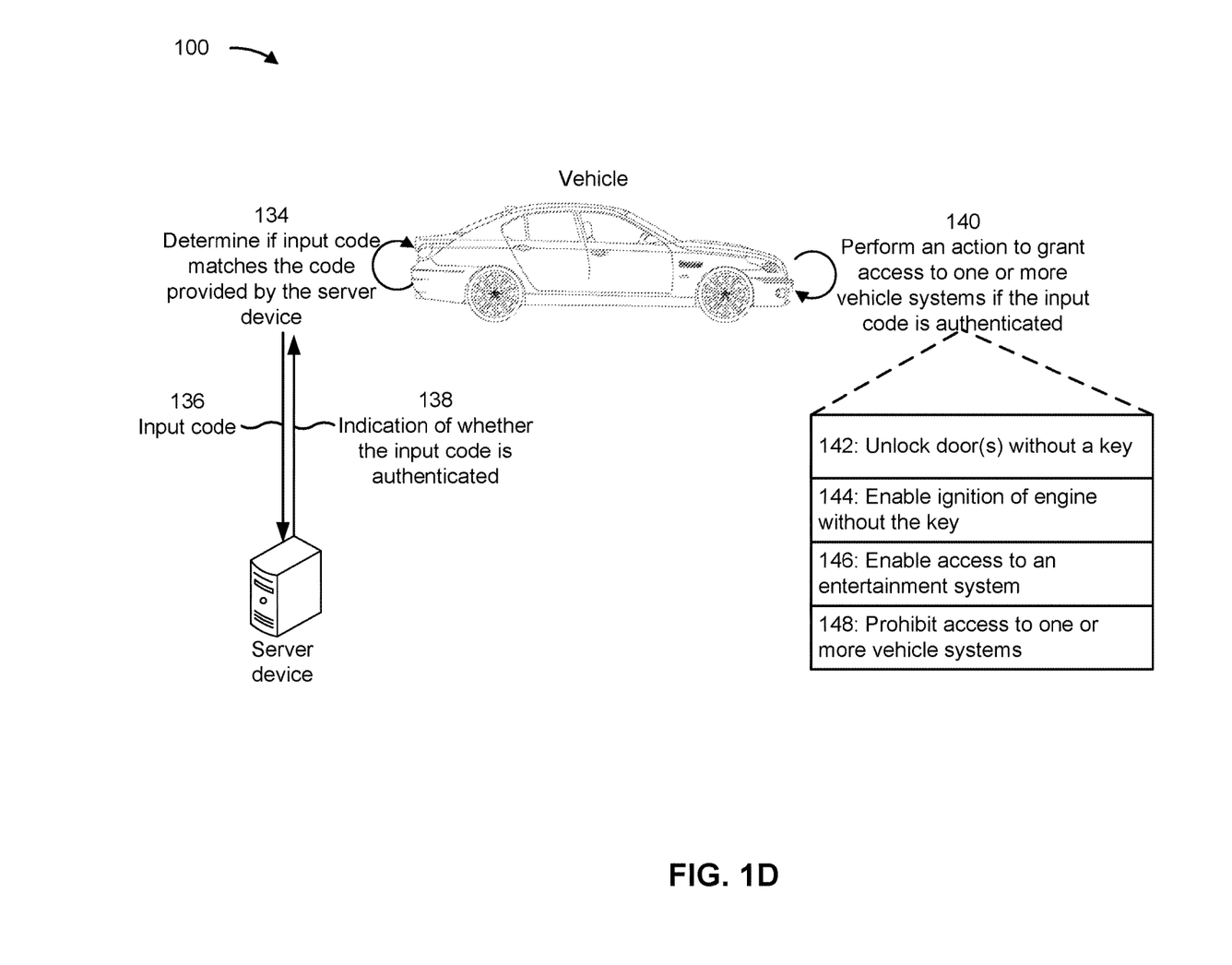

As shown in FIG. 1D, and by reference number 134, the vehicle may determine if the input code (e.g., provided by the user and detected by the camera device) matches the code provided to the user device by the server device. For example, in some implementations, the vehicle may determine if the input code matches the code provided by the server device (e.g., if the server device provided the code to the vehicle). In some implementations, as shown by reference number 136, the vehicle may transmit, and the server device may receive, an indication of the input code detected and/or determined by the vehicle. The server device may determine whether the input code matches the code provided to the user device (e.g., the code generated by the server device associated with granting authenticated access to the vehicle). As shown by reference number 138, the server device may transmit, and the vehicle may receive, an indication of whether the input code is authenticated. For example, if the input code matches the code provided to the user device, then the input code may be authenticated by the vehicle and/or the server device. If the input code does not match the code provided to the user device, then the input code may not be authenticated by the vehicle and/or the server device.

As shown by reference number 140, the vehicle may perform an action to grant access to one or more systems (e.g., vehicle systems) associated with the vehicle if the input code is authenticated, as described above. In other words, if the input code is authenticated by the vehicle and/or the server device, then the vehicle may perform an action to grant access to the user (e.g., to enter and/or to use the vehicle). For example, as shown by reference number 142, the vehicle may perform an action to cause one or more doors of the vehicle to be unlocked (e.g., without a key or access device being presented) based on authenticating the input code. For example, a vehicle system may include a security system or a vehicle access system that controls one or more locks of doors of the vehicle. The security system or the vehicle access system may cause at least one door to be unlocked based on authenticating the input code.

In some implementations, as shown by reference number 144, the vehicle may perform an action to enable an ignition of an engine of the vehicle (e.g., without a key or access device being presented) based on authenticating the input code. For example, a vehicle system may include an ignition system. The ignition system may enable a user to start or ignite the engine of the vehicle (e.g., without detecting a key or access device associated with the vehicle) based on the input code being authenticated, as described above. For example, the vehicle may perform an action to enable an engine of the vehicle to be started without detecting the key associated with the vehicle and/or the door of the vehicle. In other words, the user may be enabled to drive the vehicle based on entering the correct code on the exterior of the vehicle using the AR keypad displayed on the user device, as described above.

In some implementations, as shown by reference number 146, the vehicle may perform an action to enable access to an entertainment and/or navigation system of the vehicle. For example, a vehicle system may include an entertainment system that controls a radio, one or more displays, and/or a sound system of the vehicle. The entertainment system may enable the user to control and/or interact with the entertainment system based on the input code being authenticated, as described above. The vehicle may perform other actions to enable the user to access other vehicle systems based on the input code being authenticated, as described above. For example, entering the correct code as described above may allow a user to test drive or to rent the vehicle for a limited period of time.

In some implementations, the vehicle may grant access to the user to the one or more vehicle systems for a limited amount of time. For example, the vehicle may grant access for a set period of time (e.g., 30 minutes, 1 hour, 6 hours, 1 day, 3 days, and/or another amount of time). After an expiration of the amount of time, the vehicle may perform an action to prevent the user from accessing the one or more systems.

In some implementations, as shown by reference number 148, the vehicle may perform an action to prevent access to one or more vehicle systems and/or one or more components associated with the vehicle. For example, the vehicle may grant access to the user to one or more vehicle systems and may prohibit or restrict access to one or more other vehicle systems. For example, entering the correct code as described above may enable a user to open a door of the vehicle and to start the engine of the vehicle, but the vehicle may perform an action to prohibit the hood of the vehicle from being opened (e.g., to prevent the user from inspecting or interacting with the engine of the vehicle). As another example, the vehicle may perform an action to prohibit the trunk or another storage area of the vehicle from being opened. For example, an owner of the vehicle may have items stored in a storage area and may not want to grant access to the user to the storage area (e.g., to ensure the security of the items). As another example, the vehicle may perform an action to grant the user limited access to one or more vehicle systems. For example, the user may be enabled to ignite the engine and drive the car, but the vehicle may limit or restrict a maximum speed at which the vehicle may be driven. As another example, the user may be enabled to interact with the entertainment system, but may not be enabled to modify or change settings associated with the entertainment system.

In some implementations, the vehicle may grant access to the one or more vehicle systems within a defined geographic area. For example, the vehicle and/or the server device may establish a geographic area (e.g., using a geofence or another location-based service). The vehicle may perform an action to enable the user to access the one or more vehicle systems based on the vehicle being located within the geographic area. If the vehicle and/or the server device determines that the vehicle is no longer within the geographic area, then the vehicle may perform an action to remove or prohibit access to the one or more vehicle systems.

By prohibiting access to one or more vehicle systems, granting limited access to one or more vehicle systems, and/or by granting location-based access to one or more vehicle systems, a security of the vehicle may be maintained. For example, an owner of the vehicle may grant the user access to the vehicle knowing that the user may not access all vehicle systems and/or knowing that the vehicle systems may only be accessed within a limited geographic area. This may ensure that the user cannot exceed the scope of access to the vehicle provided by the owner.

The vehicle may track and/or store information associated with a session based on determining that the input code provided by the user is authenticated. For example, as described above, a session (e.g., associated with the user, the user device, and/or the vehicle) may be initiated based on a request transmitted by the user device. The vehicle may store an identifier associated with the user device based on determining that input code is authentic. For example, the vehicle may associate the session with the identifier associated with the user device. The vehicle may receive or identify the identifier associated with the user device. For example, the user device may transmit, and the vehicle may receive, an indication of the identifier. As another example, the vehicle may identify the identifier based on the input code provided by the user (e.g., the server device may associate the code with the user device when generating the code).

Initiating the session may enable the vehicle to track one or more actions performed by the user associated with the vehicle. For example, the vehicle may monitor and store information regarding speeds at which the vehicle is driven, a route or locations that the vehicle travels to, an amount of time that the vehicle is driven, an amount of fuel consumed while the vehicle is running, and/or one or more other actions associated with the vehicle. The vehicle may transmit, and the server device may receive, information that is monitored and/or stored by the vehicle associated with the session. In this way, the vehicle and/or server device may be enabled to associate certain actions with certain users. For example, if a vehicle is damaged, the vehicle and/or the server device may be enabled to identify a user that had access to the vehicle during or around the time that the vehicle was damaged.

In some implementations, the vehicle may detect, via the camera device, one or more additional user inputs to the area of the exterior of the door after initiating the session. For example, a user may provide additional inputs to the exterior of the vehicle (e.g., aided by the AR keypad being displayed by the user device), in a similar manner as described above. The vehicle may identify an additional input code based on the one or more additional user inputs. The additional input code may be same as the input code previously provided or may be a different input code. The vehicle and/or the server device may terminate the session based on identifying the additional input code. In other words, a user may end the session by entering (or re-entering) another code on the exterior of the vehicle in a similar manner as described above. The vehicle and/or the server device may store a time at which the session is terminated. This may enable the vehicle and/or the server device to determine a period of time during which the user had access to the vehicle and/or the one or more vehicle systems (e.g., from the time when the input code is authenticated to the time when the session is terminated). In some implementations, the session may be terminated by the user device transmitting a message to the server device and/or the vehicle (e.g., rather than the user entering an additional input code).

As indicated above, FIGS. 1A-1D are provided as an example. Other examples may differ from what is described with regard to FIGS. 1A-1D.

Figure 2:
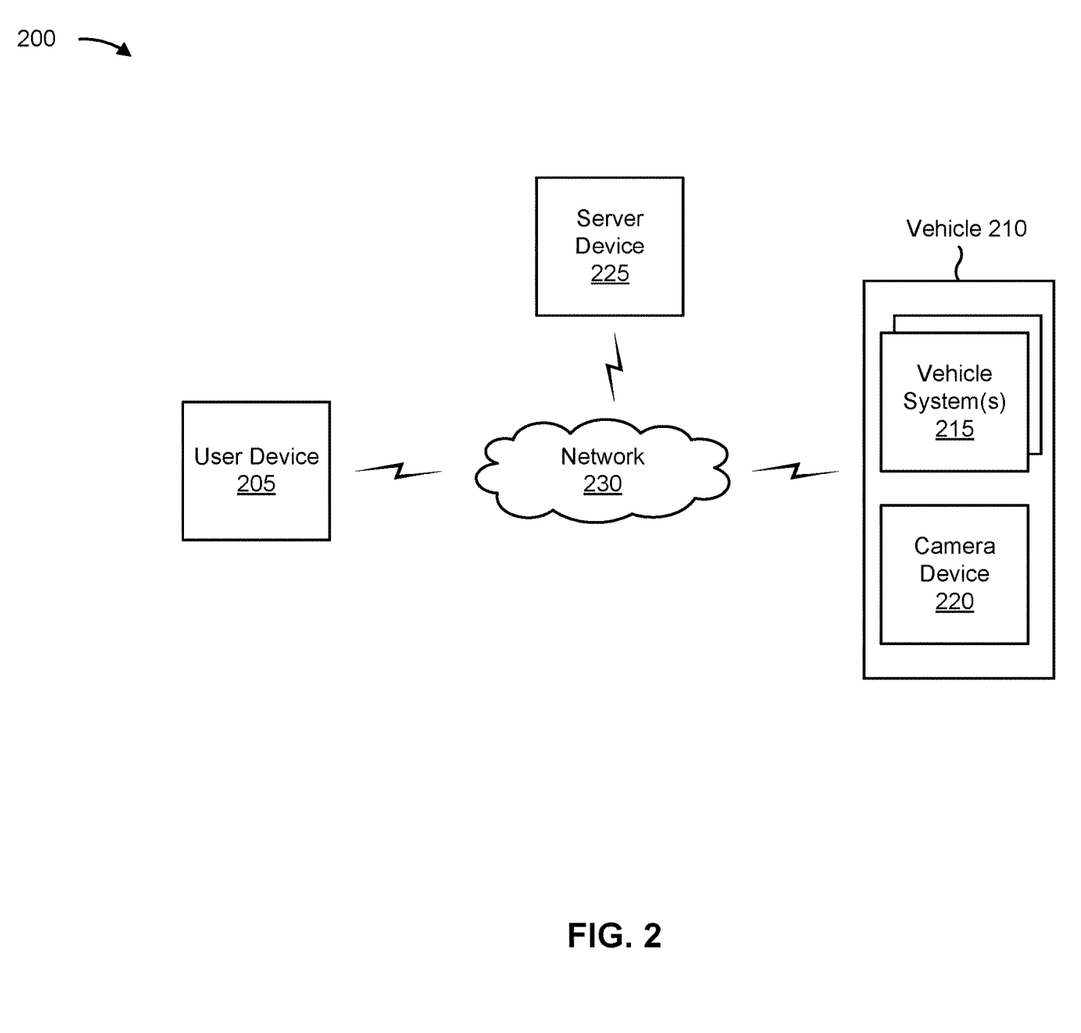
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 205, a vehicle 210, one or more vehicle systems 215, a camera device 220, a server device 225, and a network 230. As shown in FIG. 2, the vehicle 210 may include the one or more vehicle systems 215 and the camera device 220. Devices of environment 200 may interconnect via wired connections, wireless connections, or a combination of wired and wireless connections.

The user device 205 includes one or more devices capable of receiving, generating, storing, processing, and/or providing information associated with an augmented reality displayed keypad for authenticated keyless vehicle access, as described elsewhere herein. The user device 205 may include a communication device and/or a computing device. For example, the user device 205 may include a wireless communication device, a mobile phone, a user equipment, a laptop computer, a tablet computer, a gaming console, a wearable communication device (e.g., a smart wristwatch, a pair of smart eyeglasses, a head mounted display, or a virtual reality headset), an AR device, a virtual reality (VR) device, or a similar type of device.

The vehicle 210 includes one or more machines. For example, vehicle 210 may include a car, a truck, a motorcycle, a bus, a boat, an airplane, a helicopter, an unmanned aerial vehicle, farm equipment (e.g., a tractor and/or a plow), construction equipment (e.g., a bulldozer and/or an excavator), a spacecraft, and/or a similar type of machine. In some implementations, the vehicle 210 may include one or more communication systems capable of supporting a processing element. For example, the vehicle 210 may support a controller area network (CAN) bus, a personal area network (PAN) (e.g., a Bluetooth network), and/or any other communication systems and/or protocols to enable communication with another device and/or with the one or more vehicle systems 215. In some implementations, the vehicle 210 includes one or more communication devices enabling vehicle 210 to communicate with the one or more vehicle systems 215, the camera device 220, the user device 205, the server device 225, and/or other suitable devices via network 230. The vehicle 210 may include one or more memories and/or one or more processors that are configured to perform one or more actions described herein (e.g., actions that are described as being performed by a vehicle). The vehicle 210 may include the one or more vehicle systems 215 and/or the camera device 220.

The one or more vehicle systems 215 include one or more devices capable of receiving, generating, storing, processing, and/or providing information associated with an augmented reality displayed keypad for authenticated keyless vehicle access, as described elsewhere herein. For example, a vehicle system 215 may include a communication device and/or a computing device. In some implementations, a vehicle system 215 may include a system for controlling one or more components of the vehicle 210. For example, a vehicle system 215 may include a security system (e.g., for controlling access to the vehicle 210, such as one or more locks and/or doors), a vehicle access system, an ignition system (e.g., for controlling the ignition of an engine of the vehicle 210), an entertainment system (e.g., for controlling a radio, entertainment display, and/or other displays included in the vehicle 210), a climate control system (e.g., for controlling a heating and/or cooling system of the vehicle 210), an electrical system (e.g., for controlling one or more electrical components of the vehicle 210), a navigation system, a global positioning system (GPS), and/or one or more other types of systems for controlling or enabling access to one or more components of the vehicle 210.

The camera device 220 includes one or more devices capable of capturing, receiving, generating, storing, processing, and/or providing information associated with one or more images (e.g., photographs), video, and/or audio. For example, the camera device 220 may include a digital still camera, an analog still camera, a digital video camera, an analog video camera, a radar device, a light detection and ranging (Lidar) device, a sensor device, and/or a similar type of device capable of capturing image data, sensor data, video data, and/or audio data. In some implementations, the camera device 220 may include a communication device and/or computing device in communication with a camera, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a server device, a group of server devices, a cloud computing device, a data center device, or a similar type of device. The camera device 220 may include hardware, or a combination of hardware and software, that enables the camera device 220 to capture image data, sensor data, video data, and/or audio data and transmit the image data, the sensor data, the video data, and/or the audio data to another device or devices, such as the vehicle 210, one or more vehicle systems 215, the server device 225, and/or the user device 205, among other examples. In some implementations, the camera device 220 may be included in the vehicle 210. For example, the camera device 220 may be mounted on the vehicle 210 (e.g., on an external surface of the vehicle 210).

The server device 225 includes one or more devices capable of receiving, generating, storing, processing, providing, and/or routing information associated with an augmented reality displayed keypad for authenticated keyless vehicle access, as described elsewhere herein. The server device 225 may include a communication device and/or a computing device. For example, the server device 225 may include a server, such as an application server, a client server, a web server, a database server, a host server, a proxy server, a virtual server (e.g., executing on computing hardware), or a server in a cloud computing system. In some implementations, the server device 225 includes computing hardware used in a cloud computing environment.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
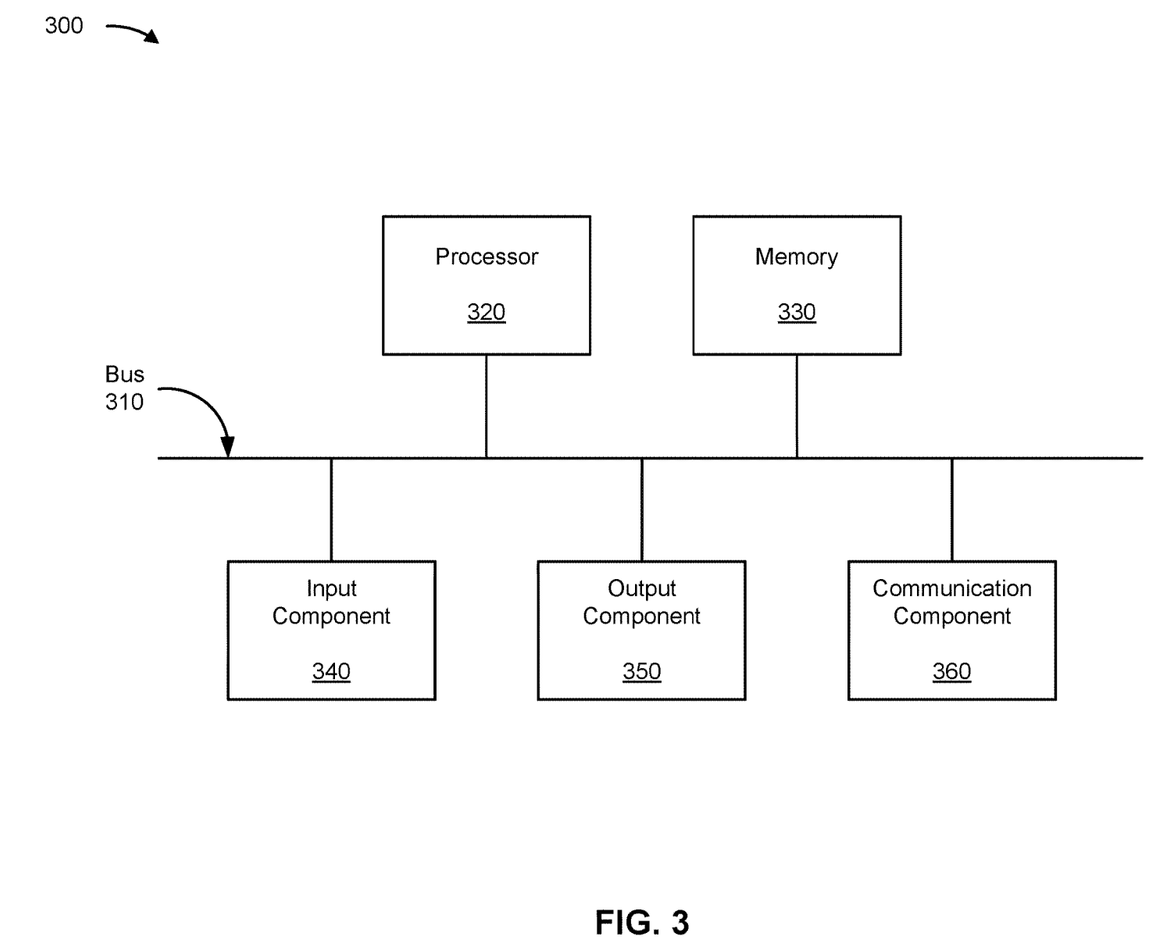
FIG. 3 is a diagram of example components of one or more devices of FIG. 2.

FIG. 3 is a diagram of example components of a device 300, which may correspond to the user device 205, the vehicle 210, the vehicle system 215, the camera device 220, and/or the server device 225. In some implementations, user device 205, the vehicle 210, the vehicle system 215, the camera device 220, and/or the server device 225 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
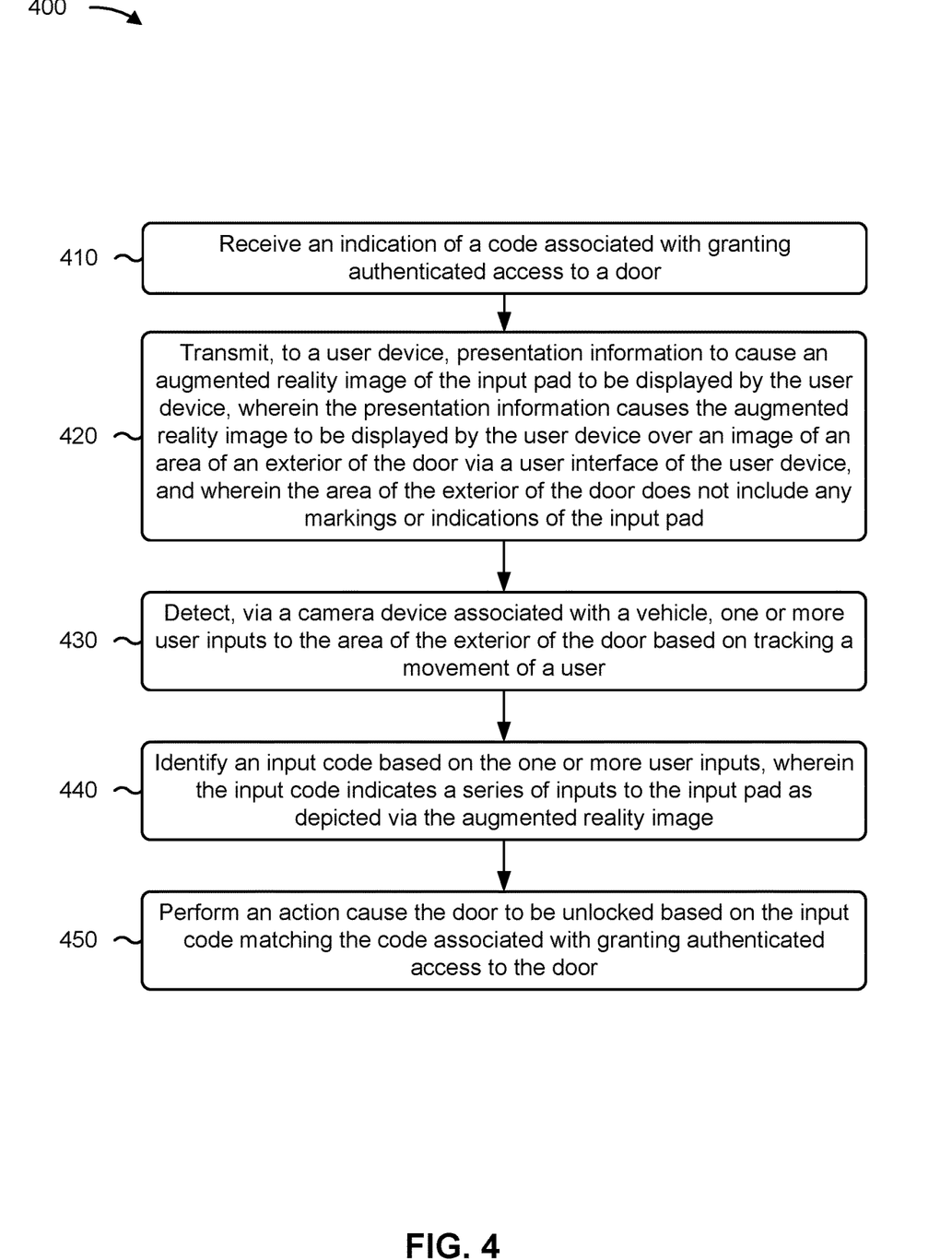
FIGS. 4 and 5 are flowcharts of example processes relating to an augmented reality displayed keypad for authenticated keyless door access.

FIG. 4 is a flowchart of an example process 400 associated with augmented reality displayed keypad for authenticated keyless vehicle access. In some implementations, one or more process blocks of FIG. 4 may be performed by a device (e.g., the vehicle 210). In some implementations, one or more process blocks of FIG. 4 may be performed by another device or a group of devices separate from or including the device, such as the one or more vehicle systems 215, the camera device 220, the user device 205, and/or the server device 225. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving an indication of a code associated with granting authenticated access to the door (block 410). As further shown in FIG. 4, process 400 may include transmitting, to a user device, presentation information to cause an augmented reality image of the input pad to be displayed by the user device (block 420). In some implementations, the presentation information causes the augmented reality image to be displayed by the user device over an area of an image of an exterior of the door via a user interface of the user device. In some implementations, the area of the exterior of the door does not include any markings or indications of the input pad. As further shown in FIG. 4, process 400 may include detecting, via a camera device associated with the door, one or more user inputs to the area of the exterior of the door based on tracking a movement of a user (block 430).

As further shown in FIG. 4, process 400 may include identifying an input code based on the one or more user inputs (block 440). In some implementations, the input code indicates a series of inputs to the input pad as depicted via the augmented reality image. As further shown in FIG. 4, process 400 may include performing an action to cause the door to be unlocked based on the input code matching the code associated with granting authenticated access to the door (block 450). In some implementations, the door may be associated with a vehicle, a building, or a room. In some implementations, process 400 may include performing an action to provide access to at least one vehicle system of a vehicle associated with the door based on the input code matching the code associated with granting authenticated access to the door.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
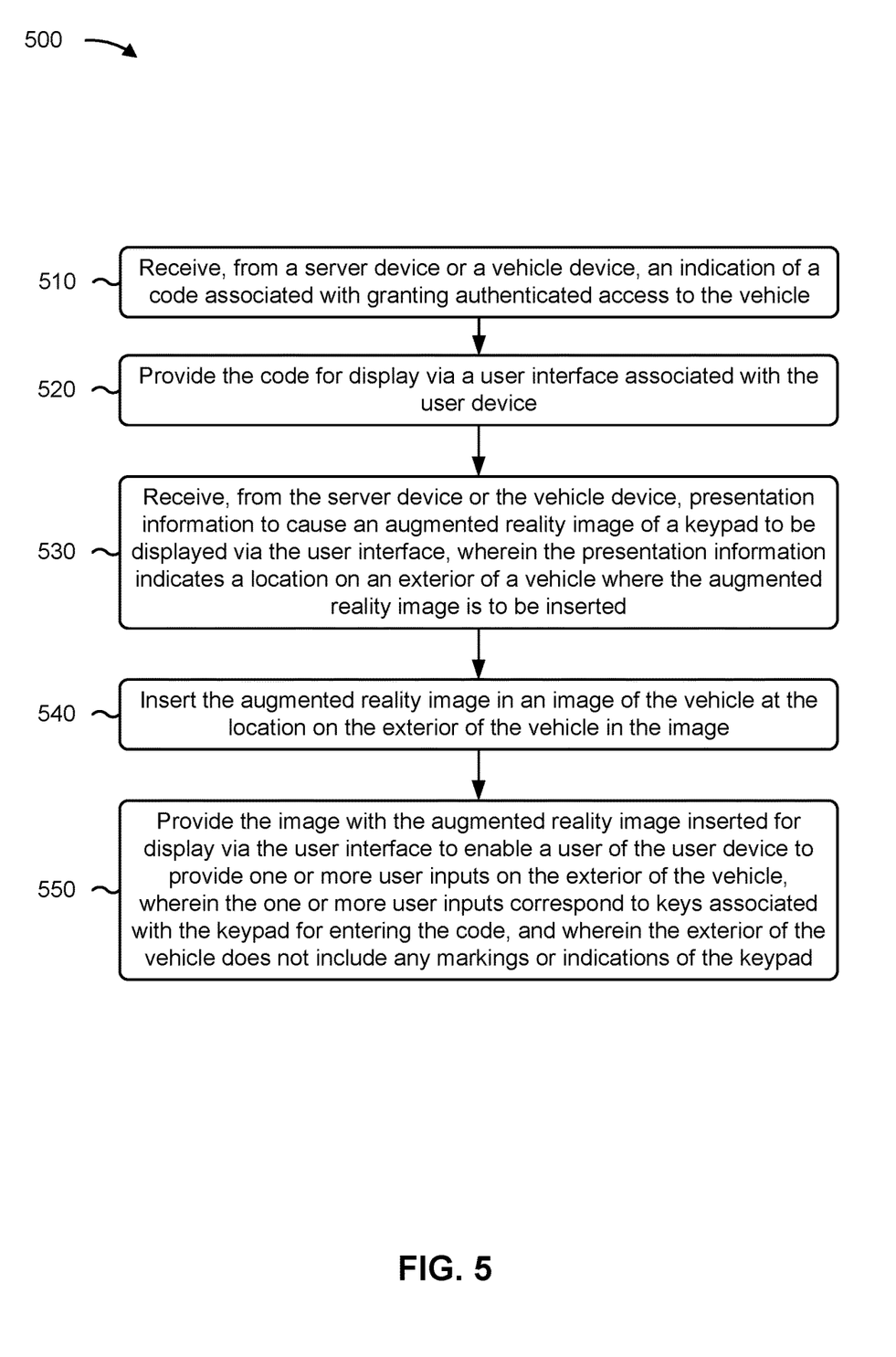

FIG. 5 is a flowchart of an example process 500 associated with augmented reality displayed keypad for authenticated keyless vehicle access. In some implementations, one or more process blocks of FIG. 5 may be performed by a user device (e.g., user device 205). In some implementations, one or more process blocks of FIG. 5 may be performed by another device or a group of devices separate from or including the user device, such as the vehicle 210, the one or more vehicle system 215, the camera device 220, and/or the server device 225. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving, from a server device or a vehicle device, an indication of a code associated with granting authenticated access to the vehicle (block 510). As further shown in FIG. 5, process 500 may include providing the code for display via a user interface associated with the user device (block 520). As further shown in FIG. 5, process 500 may include receiving, from the server device or the vehicle device, presentation information to cause an augmented reality image of a keypad to be displayed via the user interface (block 530). In some implementations, the presentation information indicates a location on an exterior of a vehicle where the augmented reality image is to be inserted. As further shown in FIG. 5, process 500 may include inserting the augmented reality image in an image of the vehicle at the location on the exterior of the vehicle in the image (block 540). As further shown in FIG. 5, process 500 may include providing the image with the augmented reality image inserted for display via the user interface to enable a user of the user device to provide one or more user inputs on the exterior of the vehicle (block 550). In some implementations, the one or more user inputs correspond to keys associated with the keypad for entering the code, and wherein the exterior of the vehicle does not include any markings or indications of the keypad.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing an augmented reality displayed keypad for authenticated keyless vehicle access, the system comprising:
    a camera device mounted on a vehicle;
    one or more vehicle systems associated with the vehicle;
    one or more memories; and
    one or more processors, coupled to the one or more memories, configured to:
        receive an indication of a code associated with granting authenticated access to the vehicle;
        transmit, to a user device, presentation information to cause an augmented reality image of the keypad to be displayed by the user device, wherein the presentation information causes the augmented reality image to be displayed on a user interface of the user device in an area of an image of an exterior of the vehicle, and wherein the area of the exterior of the vehicle does not include any markings or indications of the keypad;
        detect, via the camera device, one or more user inputs to the area of the exterior of the vehicle based on tracking a user movement by the camera device;
        identify an input code based on the one or more user inputs, wherein the input code corresponds to a series of inputs to the keypad entered by a user, of the user device, to the area of the exterior of the vehicle; and
        provide access to at least one vehicle system, of the one or more vehicle systems, based on the input code matching the code associated with granting authenticated access to the vehicle.

2. The system of claim 1, wherein the at least one vehicle system includes a vehicle access system, and wherein the one or more processors, to provide access to the at least one vehicle system, are configured to:
    cause a door of the vehicle to be unlocked via the vehicle access system.

3. The system of claim 1, wherein the one or more processors, to identify the input code based on the one or more user inputs, are configured to:
    detect, via the camera device, a user input, of the one or more user inputs, to the area of the exterior of the vehicle;
    determine an input area in the area of the exterior of the vehicle based on a distance between the user input and the camera device and an angle between the user input and the camera device; and
    identify an input associated with the user input based on correlating the input area to the keypad that is displayed via the augmented reality image.

4. The system of claim 1, wherein the one or more processors are further configured to:
    determine whether the input code matches the code associated with granting authenticated access to the vehicle.

5. The system of claim 1, wherein the one or more processors, to receive the indication of the code associated with granting authenticated access to the vehicle, are configured to:
    receive, from a server device, an indication of the code, wherein the code is associated with a session associated with a user of the user device, and wherein the code is a temporary code.

6. The system of claim 1, wherein the one or more processors are further configured to:
    receive or identify an identifier associated with the user device; and
    store the identifier associated with the user device based on determining the input code.

7. The system of claim 1, wherein the one or more processors are further configured to:
    initiate a session associated with a user of the user device based on providing access to the at least one vehicle system, wherein the session enables the system to track one or more actions performed by the user associated with the vehicle.

8. The system of claim 1, wherein the camera device is an image capturing device or a light detection and ranging (Lidar) device.

9. A method for providing an augmented reality displayed input pad for authenticated keyless door access, comprising:
    receiving, by a device, an indication of a code associated with granting authenticated access to a door;
    transmitting, by the device and to a user device, presentation information to cause an augmented reality image of the input pad to be displayed by the user device, wherein the presentation information causes the augmented reality image to be displayed by the user device over an area of an image of an exterior of the door via a user interface of the user device, and wherein the area of the exterior of the door does not include any markings or indications of the input pad;
    detecting, by the device and via a camera device associated with the door, one or more user inputs to the area of the exterior of the door based on tracking a movement of a user;

identifying, by the device, an input code based on the one or more user inputs, wherein the input code indicates a series of inputs to the input pad as depicted via the augmented reality image; and performing, by the device, an action to cause the door to be unlocked based on the input code matching the code associated with granting authenticated access to the door.

10. The method of claim 9, wherein performing the action comprises:

performing the action to cause at least one of:
the door to be unlocked without a key associated with the door, or
an ignition system of a vehicle associated with the door to enable an engine of the vehicle to be started without detecting the key associated with the door.

11. The method of claim 9, wherein identifying the input code based on the one or more user inputs comprises:

tracking, via the camera device, a user input, of the one or more user inputs, to the area of the exterior of the door;
determining an input area in the area of the exterior of the door based on a distance between the user input and the camera device and an angle between the user input and the camera device; and
identifying an input associated with the user input based on correlating the input area to the input pad that is displayed via the augmented reality image.

12. The method of claim 9, wherein the door is associated with at least one of a vehicle or a building.

13. The method of claim 9, further comprising:

receiving, from a server device or from the user device, an identifier associated with the user device; and
storing the identifier associated with the user device based on determining the input code.

14. The method of claim 9, wherein performing the action comprises:

providing access to a vehicle system of a vehicle associated with the door for a limited amount of time or while the vehicle is located within a defined geographic area.

15. The method of claim 9, further comprising:

initiating a session associated with a user of the user device based on causing the door to be unlocked, wherein the session enables the device to track one or more actions performed by the user associated with a vehicle associated with the door.

16. The method of claim 15, further comprising:

detecting, via the camera device, one or more additional user inputs to the area of the exterior of the door after initiating the session;

identifying, by the device, an additional input code based on the one or more additional user inputs, wherein the additional input code is the input code or a different input code; and
terminating the session based on identifying the additional input code.

17. A non-transitory computer-readable medium storing a set of instructions, the set of instructions comprising:

one or more instructions that, when executed by one or more processors of a user device, cause the user device to:
receive, from a server device or a vehicle device, an indication of a code associated with granting authenticated access to a vehicle;
provide the code for display via a user interface associated with the user device;
receive, from the server device or the vehicle device, presentation information to cause an augmented reality image of a keypad to be displayed via the user interface, wherein the presentation information indicates a location on an exterior of the vehicle where the augmented reality image is to be inserted;
insert the augmented reality image in an image of the vehicle at the location on the exterior of the vehicle in the image; and
provide the image with the augmented reality image inserted for display via the user interface to enable a user of the user device to provide one or more user inputs on the exterior of the vehicle, wherein the one or more user inputs correspond to keys associated with the keypad for entering the code, and wherein the exterior of the vehicle does not include any markings or indications of the keypad.

18. The non-transitory computer-readable medium of claim 17, wherein the one or more user inputs on the exterior of the vehicle cause access to be granted to the user to one or more vehicle systems associated with the vehicle.

19. The non-transitory computer-readable medium of claim 17, wherein the one or more instructions, that cause the user device to insert the augmented reality image in the image of the vehicle, cause the user device to:

identify a reference point on the exterior of the vehicle associated with the location, wherein the reference point is indicated by the presentation information; and
insert the augmented reality image in the image relative to the reference point.

20. The non-transitory computer-readable medium of claim 17, wherein the one or more user inputs are not tracked or registered by the user device.

* * * * *